(12) United States Patent
Craig

(10) Patent No.: US 12,029,165 B2
(45) Date of Patent: Jul. 9, 2024

(54) SUGARCANE HARVESTER BILLET DISCHARGE CONTROL

(71) Applicant: Deere and Company, Moline, IL (US)

(72) Inventor: Paul I. Craig, Thibodaux, LA (US)

(73) Assignee: DEERE AND COMPANY, Moline, IL (US)

(*) Notice: Subject to any disclaimer, the term of this patent is extended or adjusted under 35 U.S.C. 154(b) by 341 days.

(21) Appl. No.: 16/860,168

(22) Filed: Apr. 28, 2020

(65) Prior Publication Data

US 2021/0329840 A1 Oct. 28, 2021

(51) Int. Cl.
| | |
|---|---|
| *A01D 45/10* | (2006.01) |
| *A01D 41/12* | (2006.01) |
| *A01D 41/127* | (2006.01) |
| *A01D 43/073* | (2006.01) |
| *A01D 43/08* | (2006.01) |
| *A01D 61/02* | (2006.01) |

(52) U.S. Cl.
CPC ......... *A01D 45/10* (2013.01); *A01D 41/1217* (2013.01); *A01D 41/127* (2013.01); *A01D 43/073* (2013.01); *A01D 43/08* (2013.01); *A01D 61/02* (2013.01)

(58) Field of Classification Search
CPC .. A01D 45/10; A01D 41/127; A01D 41/1217; A01D 41/1277; A01D 41/1226; A01D 43/07; A01D 43/073; A01D 43/077; A01D 61/00
See application file for complete search history.

(56) References Cited

U.S. PATENT DOCUMENTS

| | | | |
|---|---|---|---|
| 623,109 | A | 4/1899 | Schuman |
| 1,031,472 | A | 7/1912 | Schubert |
| 1,847,433 | A * | 3/1932 | Krause ............... A01D 61/00 198/536 |
| 2,092,134 | A | 9/1937 | Oppenheim |
| 4,155,602 | A * | 5/1979 | Quick ............... A01D 45/10 209/139.1 |
| 4,270,337 | A | 6/1981 | Pinto |
| 4,295,325 | A | 10/1981 | Cannavan |

(Continued)

FOREIGN PATENT DOCUMENTS

| | | |
|---|---|---|
| CN | 103563556 A | 2/2014 |
| DE | 102016116043 A1 * | 3/2018 |

(Continued)

*Primary Examiner* — Adam J Behrens
(74) *Attorney, Agent, or Firm* — Michael Best & Friedrich LLP

(57) ABSTRACT

A sugarcane harvester may include a base cutter configured to cut sugarcane, a chopping device in communication with the base cutter to receive the sugarcane cut by the base cutter, the chopping device configured to chop the cut sugarcane into billets, an elevator in communication with the chopping device, the elevator configured to transport the billets out of the sugarcane harvester, the elevator having a discharge end, a forward billet deflector beyond the discharge end of the elevator distant the discharge end, a rearward billet deflector proximate the discharge end and spaced from the forward billet deflector such that the billets fall between the forward billet deflector and the rearward billet deflector and a powered actuator to move the rearward billet deflector to adjust a discharge direction of the billets.

17 Claims, 4 Drawing Sheets

(56) References Cited

U.S. PATENT DOCUMENTS

| | | | |
|---|---|---|---|
| 4,555,896 A | 12/1985 | Stiff et al. | |
| 5,031,392 A | 7/1991 | Baker | |
| 5,092,110 A | 3/1992 | Dommert et al. | |
| 5,129,219 A | 7/1992 | Baker | |
| 5,167,581 A * | 12/1992 | Haag | A01D 41/1217 56/16.6 |
| 5,379,578 A * | 1/1995 | Landry | A01D 45/10 56/14.5 |
| 5,488,820 A * | 2/1996 | Cannavan | A01D 45/10 56/504 |
| 5,558,282 A | 9/1996 | Ameye et al. | |
| 6,272,819 B1 * | 8/2001 | Wendte | A01D 41/1274 56/11.9 |
| 6,363,700 B1 | 4/2002 | Fowler | |
| 6,497,546 B2 * | 12/2002 | Wood | B60P 1/42 414/335 |
| 6,974,021 B1 * | 12/2005 | Boevers | A01D 41/1217 198/671 |
| 7,195,557 B2 | 3/2007 | Hettiger | |
| 8,682,540 B2 * | 3/2014 | Missotten | A01D 43/087 701/50 |
| 8,924,030 B2 | 12/2014 | Wendte et al. | |
| 9,084,393 B1 | 7/2015 | Singleton | |
| 9,456,547 B2 | 10/2016 | Cazenave et al. | |
| 9,702,753 B2 | 7/2017 | Johnson et al. | |
| 9,788,485 B2 | 10/2017 | Craig et al. | |
| 10,091,934 B2 | 10/2018 | Dugas et al. | |
| 10,317,272 B2 | 6/2019 | Bhavsar et al. | |
| 10,645,876 B2 | 5/2020 | Dugas et al. | |
| 10,806,079 B2 | 10/2020 | Gunda et al. | |
| 11,224,170 B2 | 1/2022 | Dighton et al. | |
| 2004/0053653 A1 | 3/2004 | Isfort et al. | |
| 2004/0224735 A1 | 11/2004 | Hinds | |
| 2005/0016145 A1 * | 1/2005 | Huff, Jr. | A01D 43/14 56/16.4 R |
| 2009/0017885 A1 | 1/2009 | Halls | |
| 2009/0272619 A1 * | 11/2009 | Leal | B60P 1/42 193/4 |
| 2011/0307149 A1 * | 12/2011 | Pighi | A01D 43/087 700/218 |
| 2012/0024670 A1 * | 2/2012 | Koerselman | B65G 11/126 198/671 |
| 2012/0110969 A1 | 5/2012 | Hinds | |
| 2013/0095899 A1 | 4/2013 | Knapp | |
| 2013/0145940 A1 | 6/2013 | Roberge et al. | |
| 2013/0251484 A1 * | 9/2013 | Wood | A01D 43/073 414/345 |
| 2014/0128134 A1 * | 5/2014 | Linde | B65G 33/08 460/114 |
| 2014/0295923 A1 | 10/2014 | Vergote | |
| 2015/0327438 A1 | 11/2015 | Cazenave et al. | |
| 2016/0057927 A1 * | 3/2016 | Bojsen | A01D 41/1217 414/526 |
| 2016/0088794 A1 | 3/2016 | Baumgarten et al. | |
| 2016/0252384 A1 * | 9/2016 | Wilson | A01D 41/00 73/149 |
| 2017/0042088 A1 * | 2/2017 | Nykamp | A01D 41/1217 |
| 2017/0055446 A1 * | 3/2017 | Nykamp | B60R 1/00 |
| 2017/0086372 A1 | 3/2017 | Palla et al. | |
| 2017/0112058 A1 | 4/2017 | Craig et al. | |
| 2017/0112063 A1 | 4/2017 | Craig | |
| 2017/0325402 A1 | 11/2017 | Craig | |
| 2018/0084718 A1 | 3/2018 | Baumgarten et al. | |
| 2018/0116114 A1 | 5/2018 | Craig et al. | |
| 2019/0037770 A1 | 2/2019 | Dugas et al. | |
| 2019/0183052 A1 | 6/2019 | Craig | |
| 2019/0230856 A1 * | 8/2019 | Dighton | G06V 20/56 |
| 2019/0261564 A1 | 8/2019 | Gunda et al. | |
| 2019/0350136 A1 | 11/2019 | Craig | |
| 2020/0077591 A1 | 3/2020 | Xu et al. | |
| 2020/0137958 A1 | 5/2020 | Hansen et al. | |
| 2020/0404842 A1 * | 12/2020 | Dugas | A01D 45/10 |
| 2021/0400870 A1 | 6/2021 | Sunil et al. | |
| 2021/0195840 A1 * | 7/2021 | Puryk | A01D 90/10 |
| 2021/0315161 A1 * | 10/2021 | Pereira | A01D 45/10 |
| 2022/0232768 A1 | 7/2022 | Craig | |
| 2022/0232772 A1 | 7/2022 | Craig et al. | |
| 2023/0028281 A1 | 1/2023 | Lorriette et al. | |

FOREIGN PATENT DOCUMENTS

| | | | | |
|---|---|---|---|---|
| DE | 102018202323 A1 * | 8/2019 | | A01D 43/087 |
| DE | 102019004647 A1 * | 1/2021 | | A01D 41/127 |
| EP | 2241175 A1 * | 10/2010 | | A01D 41/1217 |
| FR | 2334285 A * | 8/1977 | | A01D 45/10 |
| GB | 2517049 A * | 2/2015 | | A01D 41/1217 |
| JP | H10215633 A | 8/1998 | | |
| WO | 2000032026 A1 | 6/2000 | | |
| WO | WO2017187249 | 2/2017 | | |
| WO | 2017094588 A1 | 6/2017 | | |
| WO | 2018037542 A1 | 3/2018 | | |
| WO | 2018037543 A1 | 3/2018 | | |
| WO | WO-2018142768 A1 * | 8/2018 | | A01D 41/127 |
| WO | WO-2019220815 A1 * | 11/2019 | | |
| WO | 2021049476 A1 | 3/2021 | | |
| WO | 2022137791 A1 | 6/2022 | | |

* cited by examiner

SUGARCANE HARVESTER BILLET DISCHARGE CONTROL

BACKGROUND

Sugarcane harvesters are used to sever sugarcane from a growing medium and chop the sugarcane into billets. The billets are conveyed by an elevator for discharge into a wagon, cart, truck or other volume. The harvested sugarcane is then transported for processing into sugar.

Figure 1:
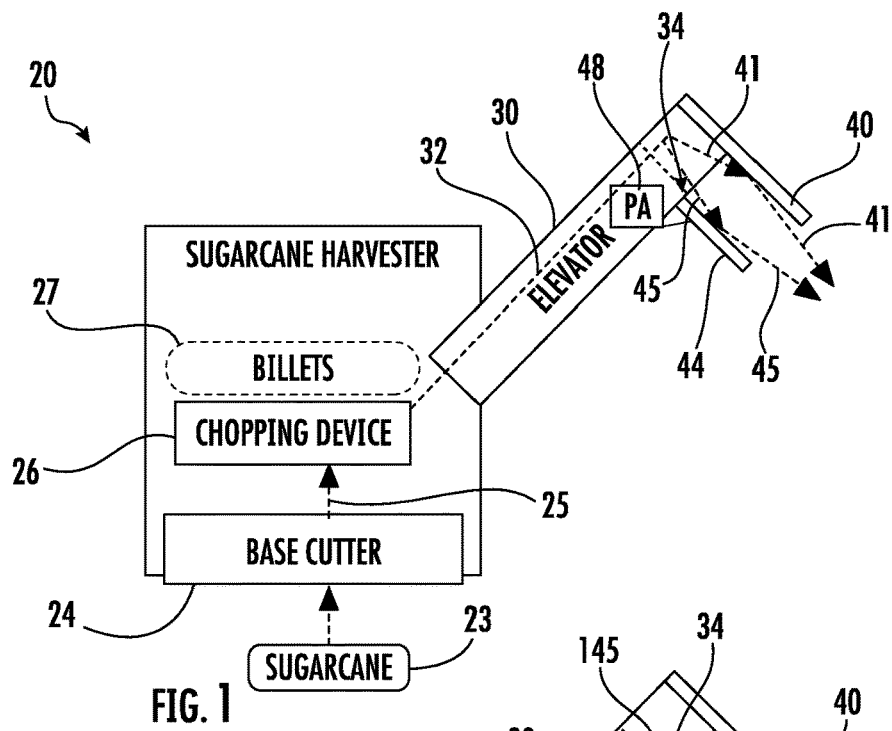
FIG. 1 is a diagram schematically illustrating portions of an example sugarcane harvester with a billet deflector in a first position.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example sugarcane harvesters, sugarcane harvesting instructions and sugarcane harvesting methods that may facilitate greater control over the discharge of sugarcane billets from sugarcane harvester elevator. Greater control over the discharge of sugarcane billets from the sugarcane harvester elevator may be used to achieve more uniform or even filling of a wagon or other volume receiving the billets or enhanced filling of the wagon or other volume based upon field conditions and operator preferences.

In some implementations, the example harvesters, instructions and methods achieve greater control over the discharge of the billets by providing a rearward billet deflector at the end of the elevator that may be repositioned from a remote location by powered actuator. In some implementations, the rearward billet deflector may pivot between different positions. In other implementations, the billet deflector may slide or linearly translate between different positions.

In some implementations, the positioning of the rearward billet deflector is automatically adjusted based upon signals that indicate a fill characteristic of the wagon or volume. In some implementations, the signals may originate from a camera or other sensor supported by the elevator. In some implementations, the signals may originate from a sensor supported by the wagon or volume itself.

In some implementations, the example harvesters, instructions and methods achieve greater control over the discharge of billets by automatically adjusting the positioning of a forward billet deflector, the rearward billet deflector or both billet deflectors based upon signals that indicate a fill characteristic of the wagon or volume. In some implementations, the signals may originate from a camera or other sensor supported by the elevator. In some implementations, the signals may originate from a sensor supported by the wagon or volume itself.

In some implementations, the signals indicating the fill characteristic of the wagon or volume may further be used as a basis for adjusting a fore-aft relative positioning of the elevator and the wagon or volume. In some implementations, based upon the fill characteristic of the wagon or volume, control signals may be output to a drive of the wagon or volume, such as a tractor or the drive of a truck providing the volume, to adjust the relative fore-aft positioning of the wagon or volume relative to the discharge end of the elevator. In some implementations, based upon the fill characteristics of the wagon or volume, control signals may be output to a fore-aft actuator to adjust the fore-aft positioning of the elevator, such as by pivoting the elevator about a vertical axis to reposition its discharge end relative to the front and rear of the wagon or other volume receiving billets.

In some implementations, based upon the fill characteristics of the wagon or volume, control signals may additionally or alternatively be output to further adjust the vertical angle at which elevator extends from the sugarcane harvester (the height of the elevator) and/or the rate at which the elevator conveys billets. In some implementations, a controller may coordinate the positioning of a rearward billet deflector, a forward billet deflector, the movement of a wagon or volume with respect to the elevator, the angular height of the elevator, the horizontal angle of the elevator and/or the rate of billet conveyance by the elevator based upon the sensed fill characteristic of the wagon or volume. Such sensing may be provided by camera or other sensor carried by the elevator, carried by the wagon or volume and/or carried by a tractor or other vehicle pulling the wagon or volume.

In some implementations, the example harvesters, instructions and methods achieve greater control over the discharge of billets by automatically adjusting the positioning of a forward billet deflector, the rearward billet deflector or both billet deflectors based upon signals that indicate a characteristic of a flow of the billets prior to the flow reaching the discharge end of the elevator. For example, the sugarcane harvester may include a sensor that detects a number, volume or mass of canes cut by a base cutter, the number of billets, the volume of billets and/or the mass of billets output by the chopping device or the number of billets, volume billets are massive billets being conveyed by an elevator toward the discharge end of the elevator. Based upon this detected characteristic, a controller may output control signals to automatically adjust the positioning of the forward billet deflector, the rearward billet deflector or both billet deflectors immediately prior to or at the estimated time at which the sensed flow of billets will reach the billet deflector or deflectors at the end of the elevator.

In some implementations, the positioning of the forward billet deflector, the rearward billet deflector or both billet deflectors may be automatically adjusted based upon multiple input factors such as both the fill characteristic of the volume being filled with billets and the flow characteristics of the billets moving towards the discharge end of the elevator. In some implementations, horizontal and/or vertical pivoting of the elevator and/or the rate at which the elevator conveys billets may also be automatically adjusted based upon such multiple factors. In some implementations, the fill characteristics of the volume being filled are sensed. In some implementations, the present fill characteristics of the volume being filled may be predicted or estimated based upon previously formulated and stored fill models which are based upon the volume of the wagon or volume being filled, the shape characteristics of the wagon or volume interior being filled, the cut size or size range of the billets during a fill cycle, the mass or volume of the billets that are filling the volume during the fill cycle, the rate or rates at which billets are conveyed by the elevator during the fill cycle, the prior relative positions of the elevator and the volume during billet unloading and/or the prior positions of the forward and rearward billet deflectors during the current fill cycle, wherein a fill cycle refers to the time period during which the volume is filled starting from an empty state.

Disclosed are example sugarcane harvesters that may include a base cutter configured to cut sugarcane, a chopping device in communication with the base cutter to receive the sugarcane cut by the base cutter, the chopping device configured to chop the cut sugarcane into billets, an elevator in communication with the chopping device, the elevator configured to transport the billets out of the sugarcane harvester, the elevator having a discharge end, a forward billet deflector beyond the discharge end of the elevator distant the discharge end, a rearward billet deflector proximate the discharge end and spaced from the forward billet deflector such that the billets fall between the forward billet deflector and the rearward billet deflector and a powered actuator to move the rearward billet deflector to adjust a discharge direction of the billets.

For purposes of this disclosure, the phrase "configured to" denotes an actual state of configuration that fundamentally ties the stated function/use to the physical characteristics of the feature proceeding the phrase "configured to". For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Disclosed are example sugarcane harvesters that may include a base cutter configured to cut sugarcane, a chopping device in communication with the base cutter to receive the sugarcane cut by the base cutter, the chopping device configured to chop the cut sugarcane into billets, an elevator in communication with the chopping device, the elevator configured to transport the billets out of the sugarcane harvester, the elevator having a discharge end, a billet deflector movable relative to the discharge end to guide flow of billets from the discharge end, a powered actuator coupled to the billet deflector to move the billet deflector relative to the discharge end and a controller to receive fill signals indicating a fill characteristic of a volume receiving the billets discharged by the elevator. The controller is configured to output control signals to the powered actuator to control a discharge direction of the billets based upon the fill signals.

Disclosed are example sugarcane harvesting instructions contained on a non-transitory computer-readable medium. The instructions may include volume fill evaluation instructions to direct a processor to determine a fill characteristic of a volume receiving sugarcane billets based upon the received fill signals. The instructions may further include billet deflector positioning instructions to direct the processor to output control signal to a powered actuator to position a billet deflector at an end of the elevator based upon the determined fill characteristics to control a discharge direction of the billets.

Disclosed are example sugarcane harvesting methods. The methods may include determining a fill characteristic and billets in a volume receiving billets from an elevator and moving at least one billet deflector of the elevator based upon the determined fill characteristic. In some implementations, the relative fore-aft positioning of the elevator and the volume is adjusted based upon the determined fill characteristic.

FIG. 1 is a diagram schematically illustrating portions of an example sugarcane harvester 20. Sugarcane harvester 20 may provide enhanced control over the discharge of sugarcane billets from an elevator into a wagon or other volume that receives the billets from the elevator. Greater control over the discharge of sugarcane billets from the sugarcane harvester elevator may be used to achieve more uniform or even filling of a wagon or other volume receiving the billets or enhanced filling of the wagon or other volume based upon field conditions and operator preferences. Sugarcane harvester 20 comprises base cutter 24, chopping device 26 elevator 30, forward billet deflector 40, rearward billet deflector 44 and powered actuator 48.

Base cutter 24 comprises a device that is configured to cut sugarcane 23, severing the sugarcane 23 from the underlying growing medium or ground. In some implementations, base cutter 24 may comprise a pair of rotatably driven cutting blades that overlap one another. As schematically represented by arrow 25, base cutter 24 supplies chopping device 26 with the canes.

Chopping device 26 comprise the device that receives the sugarcane cut by base cutter 24 and that is configured to chop cut sugarcane into billets 27. A billet is a section of the larger or longer sugarcane provided by the base cutter 24. Each billet may have a length within a predefined range to facilitate conveyance by elevator 30 and subsequent handling.

Elevator 30 is in communication with chopping device 26 to receive billets 27 from chopping device 26. Elevator 30 extends from the remainder of sugarcane harvester such that its discharge end may be elevated above and over a volume, such as a cart or wagon, to receive the billets. Elevator 30 is configured to transport or convey the billets (as indicated by arrow 32) out of the sugarcane harvester to a discharge end 34 of the elevator 30, where the billets fall, at least partially under the force of gravity, into the underlying volume. In some implementations, elevator 30 comprises a driven endless web, chain or belt carrying a series of slats or paddles that underlie the billets when conveying the billets towards the discharge end 34 of the elevator 30.

Forward billet deflector 40 comprises a panel or other structure extending beyond and distant the discharge end 34. Forward billet deflector 40 is supported at a location such that the flow of billets propelled by elevator 30 deflects off of deflector 40 and is guided by deflector 40 as indicated by arrows 41. In some implementations, forward billet deflector 40 is fixed relative to elevator 30. In some implementations, forward billet deflector 40 is movable relative to the discharge end 34 of elevator 30 so as to guide the flow of billets 27 to different locations within the receiving volume. In some implementations, forward billet deflector 40 is movable (pivotable or slidable) with the assistance of a powered actuator that may be controlled from a remote location, such as an operator station of the sugarcane harvester 20, the operator station of the tractor pulling the volume or the vehicle providing the volume or from a location remote to the current location of the sugarcane harvester 20 and the receiving volume.

Rearward billet deflector 44 comprises a panel or other structure proximate the discharge end 34. Rearward billet deflector 40 is supported at a location such that the flow of billets flows between deflector 44 and deflector 40, a portion of the flow deflecting off of deflector 44 and being guided by deflector 44 as indicated by arrows 45. Rearward billet deflector 44 is movable relative to the discharge end 34 of elevator 30 so as to guide the flow of billets 27 to different locations within the receiving volume.

Powered actuator 48 comprises a device operably coupled to rearward billet deflector 44 so as to move rearward billet deflector 44 relative to discharge end 34 and/or forward billet deflector 40 to adjust the direction in which the flow of billets is presently being discharged. In one implementation, powered actuator 48 may comprise a hydraulic or pneumatic cylinder-piston assembly. In other implementations, powered actuator 48 may comprise an electric solenoid, an electric motor with an associated transmission or a mechanical linkage receiving power from an internal combustion engine. In some implementations, the powered actuator 48 may be controlled from a remote location, such as from an operator station of the sugarcane harvester 20, from the operator station of the tractor pulling the volume or the vehicle providing the volume or from a location remote to the current location of the sugarcane harvester 20 and the receiving volume.

Figure 2:
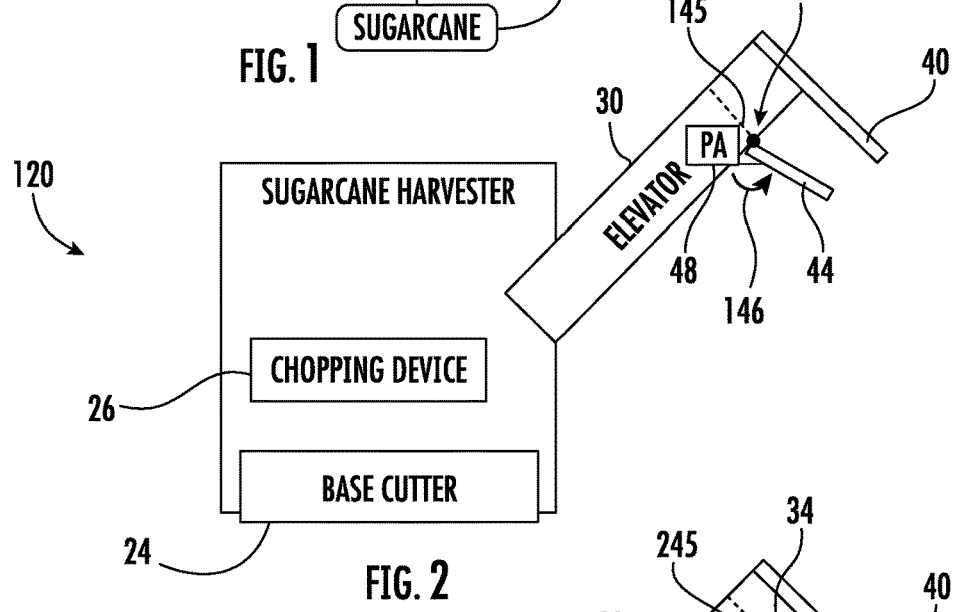
FIG. 2 is a diagram schematically illustrated portions of an example sugarcane harvester with the billet deflector moved to a second position.

FIG. 2 illustrates sugarcane harvester 120, an example of the sugarcane harvester 20 shown in FIG. 1. Sugarcane harvester 120 is similar to sugarcane harvester 20 except that rearward billet deflector 44 is specifically illustrated as being pivotably supported by elevator 30 for pivotal movement about a pivot axis 145 in the direction indicated by arrow 146 relative to discharge end 34 and/or forward billet deflector 40. FIG. 2 illustrates rearward billet deflector 44 being pivoted from the position shown in FIG. 1 to the position shown in FIG. 2.

Figure 3:
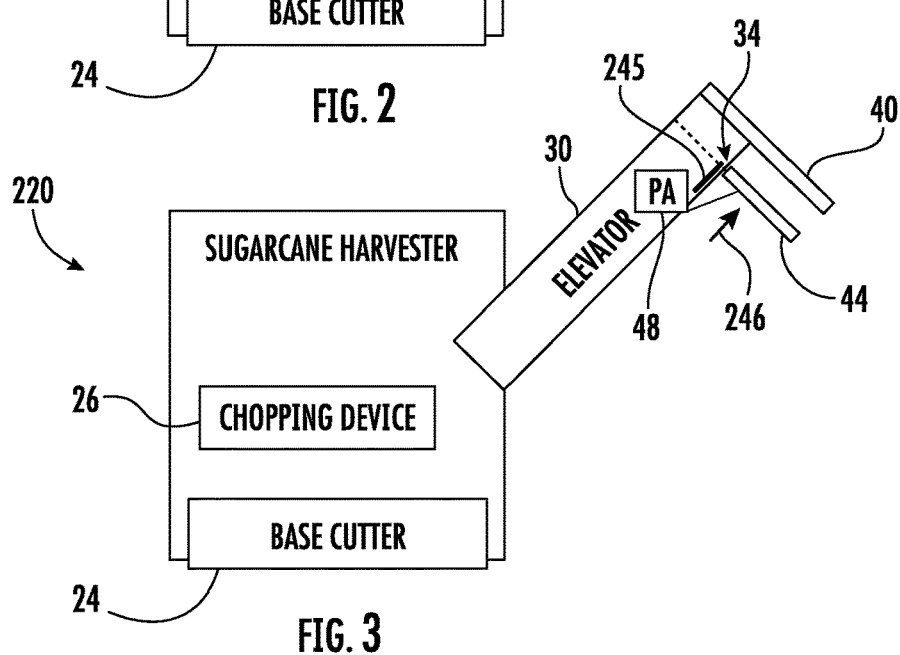
FIG. 3 is a diagram schematically illustrating portions of an example sugarcane harvester with the billet deflector moved to a second position.

FIG. 3 illustrates sugarcane harvester 220, an example of the sugarcane harvester 20 shown in FIG. 1. Sugarcane harvester 220 is similar to sugarcane harvester 20 except that rearward billet deflector 44 is specifically illustrated as being slidably supported by elevator 30 for pivotal movement along a guide rail, channel or slot 245 relative to discharge end 34 and/or forward billet deflector 40 in the direction indicated by arrow 246. FIG. 3 illustrates rearward billet deflector 44 being linearly translated from the position shown in FIG. 1 to the position shown in FIG. 3.

Figure 4:
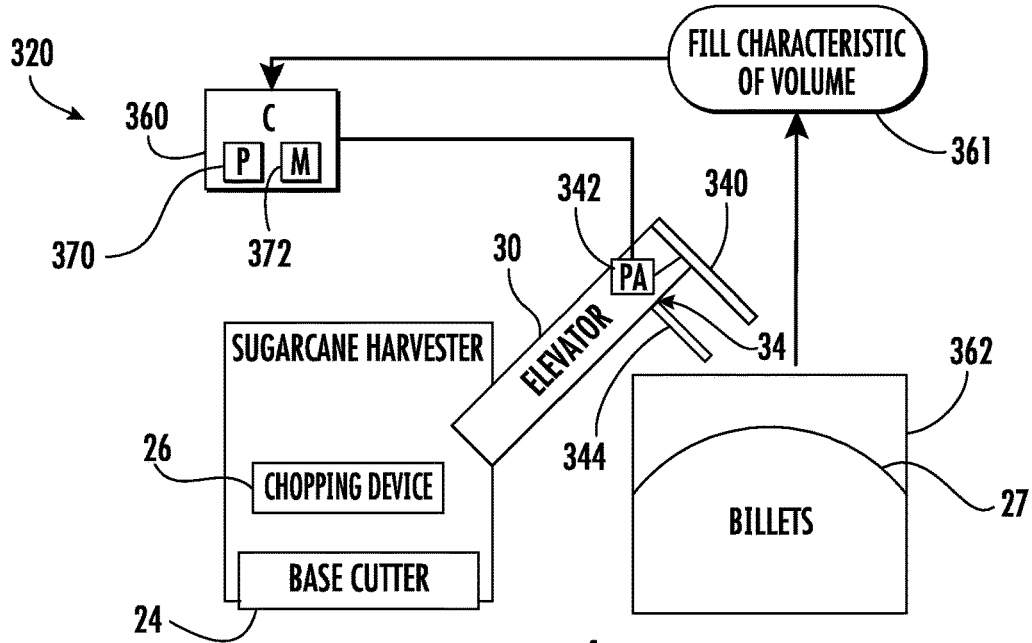
FIG. 4 is a diagram schematically illustrating portions of an example sugarcane harvester with a billet deflector in a first position.

FIG. 4 is a diagram schematically illustrating portions of an example sugarcane harvester 320. Sugarcane harvester 320 comprises base cutter 24, chopping device 26, elevator 30, forward billet deflector 340, powered actuator 342, rearward billet deflector 344 and controller 360. Base cutter 24, chopping device 26 and elevator 30 are described above with respect to harvester 20.

Forward billet deflector 340 is similar to forward billet deflector 40 described above except that forward billet deflector 340 is specifically movable relative to discharge end 34 of elevator 30. In some implementations, forward billet deflector 340 is pivotable relative to discharge end 34 of elevator 30. In some implementations, forward billet deflector 340 is slidable or translatable relative to discharge end 34 of elevator 30.

Powered actuator 342 comprises a device operably coupled to rearward billet deflector 44 so as to move forward billet deflector 340 relative to discharge end 34 and/or rearward billet deflector 344 to adjust the direction in which the flow of billets is presently being discharged. In one implementation, powered actuator 342 may comprise a hydraulic or pneumatic cylinder-piston assembly. In other implementations, powered actuator 342 may comprise an electric solenoid, an electric motor with an associated transmission or a mechanical linkage receiving power from an internal combustion engine. In some implementations, the powered actuator 342 may be controlled from a remote location, such as from an operator station of the sugarcane harvester 320, from the operator station of the tractor pulling the volume or the vehicle providing the volume or from a location remote to the current location of the sugarcane harvester 320 and the receiving volume.

Rearward billet deflector 344 is similar to rearward billet deflector 44 described above except that rearward billet deflector 344 may be movable relative to discharge end 34 of elevator 30 or may be fixed relative to discharge end 34 of elevator 30.

Controller 360 receives fill signals 361 that indicate a fill characteristic of the volume 362 receiving the billets 27 discharged by elevator 30. Controller 360 is configured to output control signals to powered actuator 342 to adjust and control the positioning of forward billet deflector 340 and the resulting discharge direction of the billets based upon the fill signals 361. Controller 360 may be carried by the sugarcane harvester itself, may be carried by a vehicle pushing or pulling volume 362 (such as a tractor) or vehicle providing volume 362 (such as a self-propelled vehicle or truck). Controller 360 may be provided at a location remote from sugarcane harvester 320, wherein controller 360 wirelessly communicates with powered actuator 342 directly or indirectly through intermediate electronics carried by harvester 320 or a vehicle connected to or providing volume 362. Controller 360 comprises processing unit 370 and non-transitory computer-readable medium 372.

Figure 5:
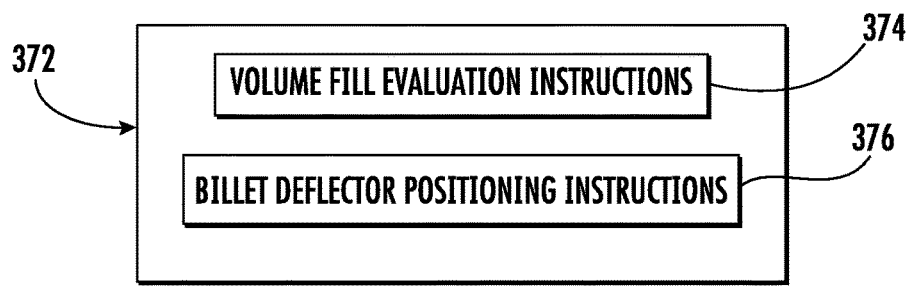
FIG. 5 is a block diagram schematically of trading an example non-transitory computer-readable medium of the sugarcane harvester of FIG. 4.

Processing unit 370 comprises a processor configured to carry out instructions contained in medium 372. Medium 372 comprises a persistent storage device or memory containing the instructions. The instructions may be in the form of software or may be in the form of circuitry or logic components, such as an application-specific integrated circuit. FIG. 5 is a block diagram schematically illustrating medium 372. As shown by FIG. 5, medium 372 comprises volume fill evaluation instructions 374 and billet deflector positioning instructions 376.

Volume fill evaluation instructions 374 direct processing unit 370 to determine a fill characteristic of volume 362. Examples of a fill characteristic include, but are not limited to, the relationship between the top surface of the mound or collection of billets 27 within volume 362 with respect to the top open edge or mouth of volume 362, the distribution of billets 27 within volume 362 and the like. In one implementation, instructions 374 direct processing unit 370 to evaluate fill signals 361 to determine the fill characteristic of volume 362. For example, instructions 374 may direct processing unit 370 to evaluate images of the mound of billets 27 within volume 362 captured by a sensor carried by elevator 30, carried by vehicle pulling volume 362, carried by a wagon providing volume 362 or otherwise provided. Such evaluation may involve optical recognition identifying the top edges of the container providing volume 362 and the top surface of billets 27 within volume 362. Such an evaluation may identify regions within volume 362 that are becoming full of billets (to avoid overfilling or spilling) and regions within volume 362 that have remaining capacity for receiving additional billets. Such an evaluation may comprise quantifying the distance of the billets from the top of the container in a region of the volume 362 that is currently receiving billets from elevator 30 or quantifying the percentage or volume of capacity in a region of the volume 362 that is currently receiving billets from elevator 30. Such an evaluation may also comprise determining the capacity in other "inactive" regions of the volume 362 that not currently receiving billets 27, wherein the fore-aft positioning of the elevator 530 relative to the volume 362 and/or the positioning of deflectors may be moved to subsequently deposit billets in the current inactive regions In one implementation, instructions 374 direct processing unit 370 to determine a fill characteristic of volume 362 using prior obtained data during the current fill cycle for the volume 362 and a fill model for the particular volume 362 being filled. In such implementations, the present fill characteristics of the volume being filled may be predicted or estimated based upon previously formulated and stored fill models which are based upon the volume of the wagon or volume being filled, the shape characteristics of the wagon or volume interior being filled, and historical data for the current fill cycle such as the cut size or size range of the billets during a fill cycle, the mass or volume of the billets that are filling the volume during the fill cycle, the rate or rates at which billets are conveyed by the elevator during the fill cycle, the prior relative positions of the elevator and the volume during billet unloading and/or the prior positions of the forward and rearward billet deflectors during the current fill cycle, wherein a fill cycle refers to the time period during which the volume is filled starting from an empty state.

In some implementations, instructions 374 may direct processing unit 370 to determine the current fill state of volume 362 using both of a fill model for volume 362 and the fill signals 361. For example, in implementations where the camera or other sensor providing signal 361 may be blocked due to airborne debris or where the reliability of such signals is low, instructions 374 may direct processing unit 370 to rely upon the fill model and the historical data for the current fill cycle. Instructions 374 may direct processing unit 370 to monitor the performance of the sensor. Upon performance of the camera or other sensor improving, instructions 374 may direct the processing unit 370 to switch from the use of the fill model back to the direct use of the fill signal 361 for determining the fill state of volume 362. In some implementations, instructions 374 may direct processing unit 370 to evaluate an accuracy of the fill model by comparing the models predicted or estimated fill state for a fill cycle given historical data with the fill state of volume 362 as determined from fill signal 361. In some implementations, instructions 374 may direct processing unit 370 to update and revise the model based upon the actual fill data obtained from fill signal 361 and the historical data for the fill cycle.

Billet deflector positioning instructions 376 comprise instructions that direct processing unit 370 to output control signals to powered actuator 342 to adjust the positioning of billet deflector 340 based upon the determined current fill state or fill characteristic(s) of volume 362. For example, in one implementation, instructions 376 may direct processing unit 370 to compare the remaining capacity of the region within volume 362 currently receiving billets discharged from elevator 30 (one example of a fill characteristic) to a predefined threshold, wherein the instructions may direct processing unit 370 to cause powered actuator 342 to adjust billet deflector 340 based upon the comparison. In one implementation, instructions 376 may direct processing unit 370 to compare the current distance or spacing between the top of the mound of billets 27 at the region of volume 362 currently receiving billets discharged from elevator 30 (another example of a fill characteristic) to a predefined spacing threshold, wherein the instructions may direct processing unit 370 to cause powered actuator 342 to adjust billet deflector 340 based upon the comparison. For example, if the spacing is below a predefined spacing threshold, the positioning of billet deflector 340 may be adjusted to avoid overfilling or spilling. In some implementations, thresholds may be predefined or maybe chosen by an operator through an operator input device to controller 360.

In some implementations, the outputting of signals to powered actuator 342 by processing unit 370 and the resulting repositioning of billet deflector 340 based upon the current fill state is automatic, omitting operator intervention. Such adjustment may be carried out repeatedly during a fill cycle. In some implementations, the outputting of such signals may occur after a recommendation is presented to an operator (via a display screen or monitor, light-emitting diode indicator, audible indicator or the like) and following authorization or confirmation by the operator through an operator input device in communication with controller 360.

As will be described hereafter, in some implementations, a second powered actuator may also be provided for selectively and controllably positioning billet deflector 344. In such implementations, instructions 376 may further direct processing unit 370 to output control signals causing the second powered actuator to also adjust the positioning of billet deflector 344 based upon the fill state of volume 362 determined pursuant to instructions 374. In some implementations, such adjustment may be synchronized. In some implementations, deflectors 340 and 344 may be mechanically linked, wherein adjustment of billet deflector 340 by powered actuator 342 also results in the same or proportional adjustment of billet deflector 344. In yet other implementations, instructions 376 may direct processing unit 370 to output control signals to a powered actuator that adjusts the positioning of billing deflector 344 based upon the fill state, wherein billet deflector 340 is not adjusted or is fixed relative to the discharge end 34 of elevator 30.

Figure 6:
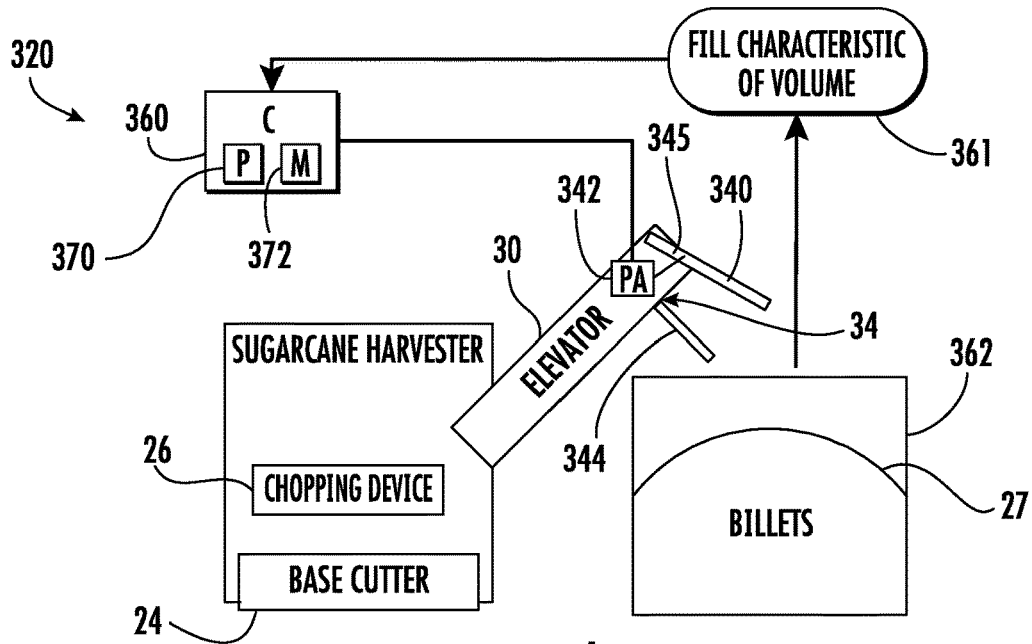
FIG. 6 is a diagram schematically illustrated portions of the example sugarcane harvester of FIG. 4 with the billet deflector in a second position.

FIG. 6 illustrates sugarcane harvester 320 following the repositioning of billet deflector 340 from the position shown in FIG. 4 to the position shown in FIG. 6 pursuant to processing unit 370 carrying out instructions 376 based upon the fill state determined pursuant to instructions 374. In the example illustrated, billet deflector 340 is pivoted about a pivot axis 345 by powered actuator 342. In other implementations, build deflector 340 may be slid or linearly translated relative to discharge end 34 of elevator 30 by powered actuator 342 (similar to harvester 220 described above with respect to FIG. 3) pursuant to processing unit 370 carrying out instructions 376 based upon the fill state determined pursuant to instructions 374.

Figure 7:
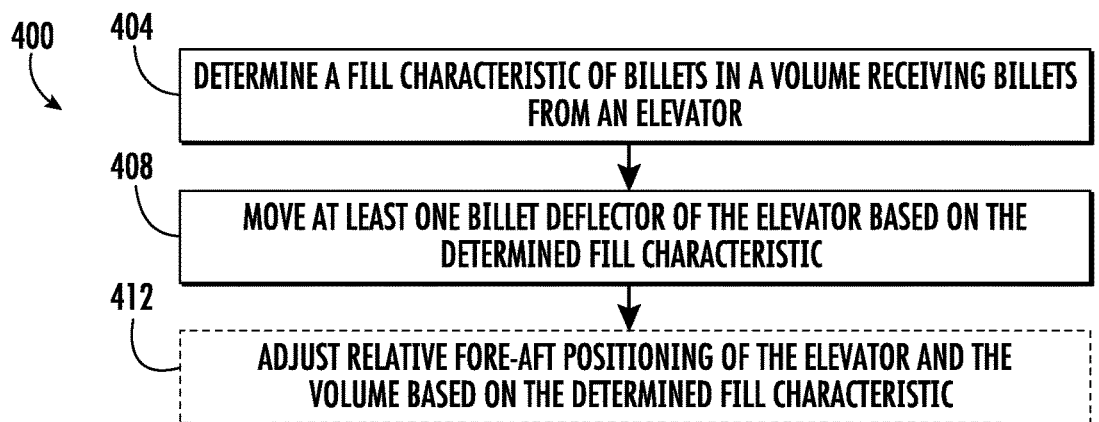
FIG. 7 is a flow diagram of an example sugarcane harvesting method.

FIG. 7 is a flow diagram of an example sugarcane harvesting method 400. Method 400 facilitates enhanced control over the discharge of sugarcane billets into a receiving volume for more uniform and faster filling of the volume. Although method 400 is described in the context of being carried out by sugarcane harvester 320, it should be appreciated that method 400 may likewise be carried out with any of the following described sugarcane harvesters or with similar sugarcane harvesters.

As indicated by block 404, controller 360 determines a fill characteristic of billets in a volume receiving billets from an elevator. As indicated by block 408, based upon the determined fill characteristic, controller 360 outputs control signals causing at least one billet deflector (billet deflector 340 and/or billet deflector 344) to be moved or repositioned. As indicated by block 412 in broken lines, in some implementations, based upon the determined fill characteristic of the volume being filled during fill cycle, controller 360 may adjust the relative fore-aft positioning of the elevator and the volume. Such adjustment may occur in response to controller 360 outputting control signals to an actuator that horizontally rotates or pivots elevator 30 or in response to controller 360 outputting control signals to a propulsion unit or drive of the sugarcane harvester and/or to the propulsion and/or drive of the vehicle providing or pulling volume 362 so as to adjust the relative front-to-rear, fore-aft positioning of elevator 30 and volume 362.

Figure 8:
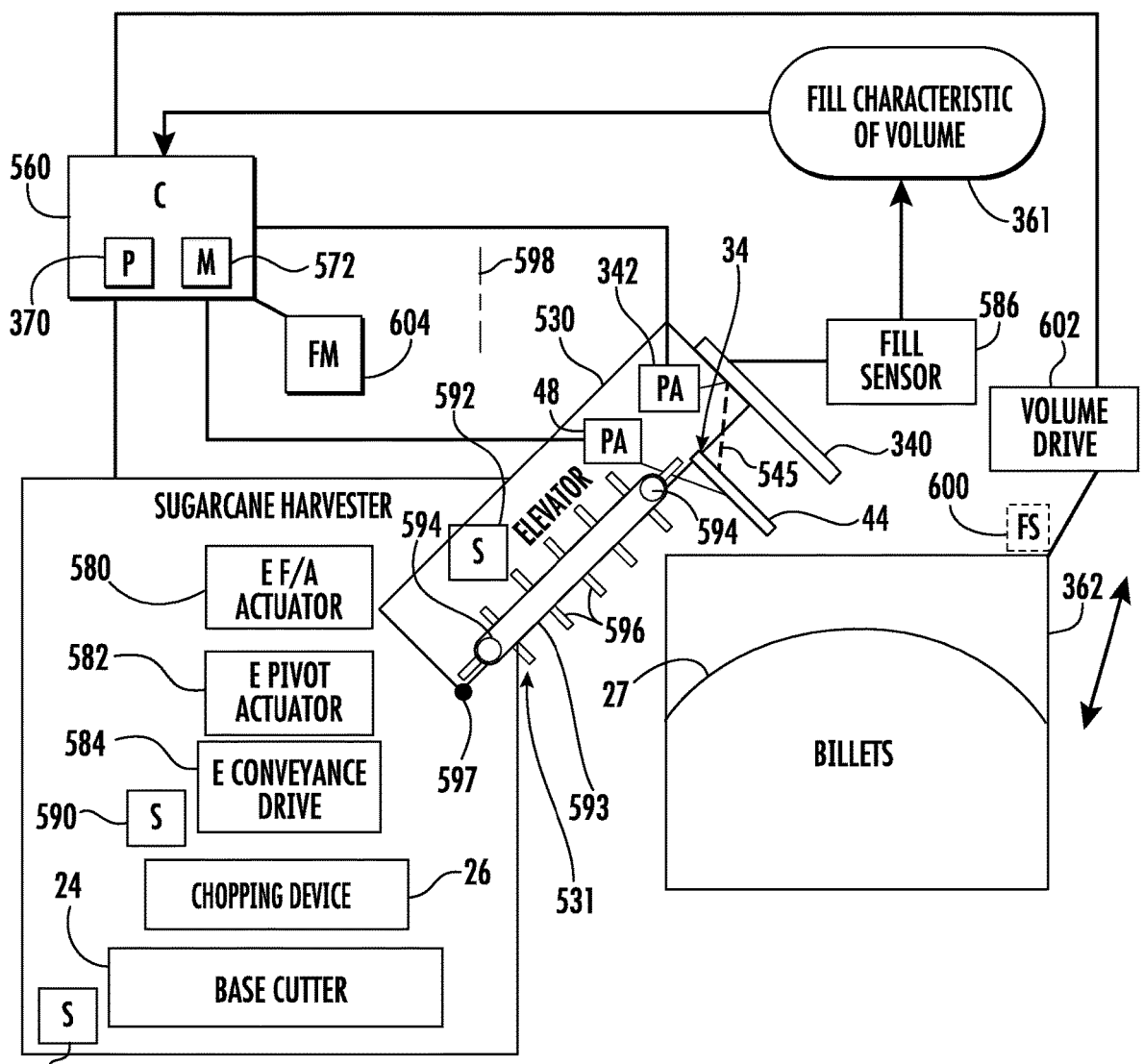
FIG. 8 is a diagram schematically illustrating portions of an example sugarcane harvester.

FIG. 8 is a diagram schematically illustrating portions of an example sugarcane harvester 520. Harvester 520 is similar to harvester 320 except that harvester 520 is specifically illustrated as comprising elevator 530, rearward billet deflector 44 and powered actuator 48 (described above) and controller 560 in place of elevator 30, rearward billet deflector 344 and controller 360, respectively. Harvester 520 is illustrated as additionally comprising elevator fore-aft actuator 580, elevator pivot actuator 582, elevator conveyance drive 584, fill sensor 586, flow sensor 588, flow sensor 590, and flow sensor 592. The remaining components of harvester 520 which correspond to components of harvester 320 are numbered similarly.

Elevator 530 is similar to elevator 30 except that elevator 530 is specifically illustrated as comprising a belt or web conveyor 531 comprising an endless driven belt, chain or web 593, driven about pulleys or sprockets 594 and carrying a series of vanes, slats or paddles 596. Such paddles 596 are driven while underlying and carrying billets 27 towards discharge end 34. In some implementations, the vanes, slats or paddles 596 may be omitted. In the example illustrated, elevator 530 is vertically pivotable about a horizontal pivot axis 597 and is horizontally pivotable or rotatable about a horizontal pivot axis 598.

In the example illustrated, billet deflectors 340 and 44 are each movable relative to discharge end 34 by the respective powered actuators 342, 48. In some implementations, such movement of deflectors 340, 44 may be synchronized or proportional. In some implementations, deflectors 340 and 44 may be independently movable relative to one another. In some implementations, as shown by broken lines, harvester 520 may comprise a linkage 545 having opposite ends pivotably connected to deflector 340 and 44, respectively, such that movement of one of deflector 340, 44 also results in movement of the other of deflector 340, 44. In some implementations, linkage 545 facilitates synchronous movement or movement in unison of deflectors 240 and 44. In such an implementation, one of powered actuators 342, 48 may be omitted.

Elevator fore-aft actuator 580 comprises a device operably coupled to elevator 530 so as to pivot or rotate elevator 530 about the vertical axis 598. Such rotation may be used to adjust the relative fore-aft positioning of the discharge end 34 of elevator 530 relative to the volume 362 receiving the billets 27. Actuator 580 may comprise a hydraulic pump and a hydraulic cylinder-piston assembly, a pneumatic pump and a pneumatic cylinder-piston assembly, a mechanical transmission coupled to an internal combustion engine or other rotary actuators.

Elevator pivot actuator 582 comprises a device operably coupled to elevator 530 so as to pivot elevator 530 about horizontal axis 597 to adjust the angle or height of elevator 530. Actuator 582 may comprise a hydraulic pump and a hydraulic cylinder-piston assembly, a pneumatic pump and a pneumatic cylinder-piston assembly, a mechanical transmission coupled to an internal combustion engine or other rotary actuators.

Elevator conveyance drive 584 comprises a device operably coupled to the driven pulley or sprocket 594 so as to drive the belt, chain or web 593 and its paddles 596. Conveyance drive 584 may comprise a hydraulic pump and a hydraulic motor, a pneumatic pump and a pneumatic motor assembly, a mechanical transmission coupled to an internal combustion engine, and electric motor or other rotary drive mechanisms.

Fill sensor 586 comprise a sensing device configured to sense the interior of volume 362. Fill sensor 586 outputs fill characteristic signals 361 which are transmitted to controller 560. Examples of sensor 586 that may be utilized include, but are not limited to, cameras, lidar, radar, ultrasonic sensors and the like. In the example illustrated, fill sensor 586 is mounted to or carried by elevator 530 so as to be focused into the interior of volume 362. As indicated by broken lines, in some implementations, sugarcane harvester 520 may additionally or alternatively comprise a fill sensor 600 carried by volume 362 or carried by the volume drive 602, wherein fill sensor 600 is similar fill sensor 586. The volume drive 602 may comprise the propulsion unit for driving the truck or vehicle providing volume 362 or the propulsion unit for driving or propelling the tractor or other vehicle pulling or pushing volume 362.

Flow sensor 588 comprises a sensor configured to output signals indicating the characteristic of the flow of canes/stalks about to be cut or being directed from base cutter 24. Flow sensor 588 is carried by the frame of sugarcane harvester 520 proximate a front of sugarcane harvester 520. Flow sensor 588 may indicate the volume of canes, the weight or mass of canes, the density of canes or the like. Examples of sensor 588 that may be utilized include, but are not limited to, cameras, lidar, radar, ultrasonic sensors and the like.

Flow sensor 590 comprises a sensor configured to output signals indicating a characteristic of the flow of billets 27 cut or output by chopping device 26. Flow sensor 590 may indicate the volume of billets, the weight or mass of billets, the density of billets or the like. Examples of sensor 590 that may be utilized include, but are not limited to, cameras, lidar, radar, ultrasonic sensors and the like. In some implementations, sensor 590 may sense the power consumption by or torque upon chopping device 26, wherein such measurements may indicate the characteristic of the flow billets 27.

Flow sensor 592 comprises a sensor configured to output signals indicating a characteristic of the flow of billets 27 being conveyed by elevator 530. Flow sensor 590 may indicate the volume of billets, the weight or mass of billets, the density of billets or the like being conveyed. Examples of sensor 590 that may be utilized include, but are not limited to, cameras, lidar, radar, ultrasonic sensors, scales or mass sensors underlying web 593 and the like. In some implementations, sensor 590 may sense the power consumption by or torque to drive web 593, wherein such measurements may indicate the characteristic of the flow billets 27.

Controller 560 comprises a processing unit 370 and non-transitory computer-readable medium 572. Medium 572 is similar to medium 372 in that medium 572 includes volume fill evaluation instructions 374 and billet deflector positioning instructions 376 (described above). Controller 560 may carry out method 400 described above. As described above, controller 560 may determine a fill state or characteristic of volume 362 using signals 361, such as from fill sensor 586 and/or fill sensor 600. As described above, controller 560 may determine a fill state or characteristic using historical data and a stored or obtained fill model, such as fill model 604. As described above, controller 560 may determine a fill state based upon a combination of both signals 361 and the fill model 604 or may update or revise fill model 604 based upon signals 361.

Based upon the determined fill state, controller 560 may output control signals to powered actuator 342, 48 to adjust the positioning of billet deflector 340, 44. In some implementations, such repositioning of the two billet deflectors may be synchronized or in proportion. In implementations where linkage 545 is provided, one of powered actuators 342, 48 may be omitted, wherein movement of one of deflectors 340, 44 results in movement of the other of deflectors 340, 44.

Based upon the determined fill state, controller 560 may additionally output control signals to adjust the relative front-to-rear, fore-aft positioning of elevator 530 and volume 362. In one mode, controller 560 may output control signals to actuator 580 that horizontally rotates or pivots elevator 530 about axis 598. In one mode, controller 560 may output control signals to propulsion unit or drive of the sugarcane harvester and/or to the propulsion and/or drive 602 of the vehicle providing or pulling volume 362 so as to adjust the relative front-to-rear, fore-aft positioning (and/or fore-aft speed) of elevator 30 and volume 362. In some modes, such fore-aft adjustment may be carried out by outputting control signals to combinations of volume drive 602, to the propulsion unit of the sugar cane harvester 520 and to actuator 580. In some implementations, based upon the determined fill state, controller 560 may output control signals to elevator pivot actuator 582 to adjust the height of elevator 530 by pivoting elevator 530 about pivot axis 597.

In addition to functioning similar to controller 360 described above, controller 560 may operate in additional modes of operation. In some implementations, the positioning of the forward billet deflector, the rearward billet deflector or both billet deflectors may be automatically adjusted based upon multiple input factors such as both the fill characteristic of the volume being filled with billets and the flow characteristics of the billets moving towards the discharge end 34 of the elevator 530. In some implementations, horizontal and/or vertical pivoting of the elevator and/or the rate at which the elevator conveys billets may also be automatically adjusted based upon such multiple factors.

In some implementations, controller 560 may automatically adjust the positioning of a forward billet deflector, the rearward billet deflector or both billet deflectors based upon signals from sensor 588, 590 and/or 592 that indicate a characteristic of a flow of the billets prior to the flow reaching the discharge end 34 of the elevator 530. In some implementations, controller 560 may automatically adjust the positioning of a forward billet deflector 340, the rearward billet deflector 44 or both billet deflectors based upon a combination of signals from sensor 588, 590 and/or 592 and the determined fill state of volume 362. For example, controller 56 may control the positioning of one or both of deflectors 340, 44 based upon the current fill state of volume 362 at a time at which a determiner estimated flow of billets is about to reach discharge end 34. Such a combination may further assist in reducing the likelihood of overfilling of volume 362 while enhancing the fill percentage or fill efficiency of volume 362. In some implementations, the fill state of volume 362 and the flow characteristics of the billets traveling through harvester 520 may additional be used by controller 560 as a basis for outputting control signals to drive 584 to adjust the rate at which billets are being conveyed by elevator 530, to actuator 582 to adjust the angle or height of elevator 530 and/or to actuator 582 adjust the fore-aft positioning of elevator 530.

Figure 9:
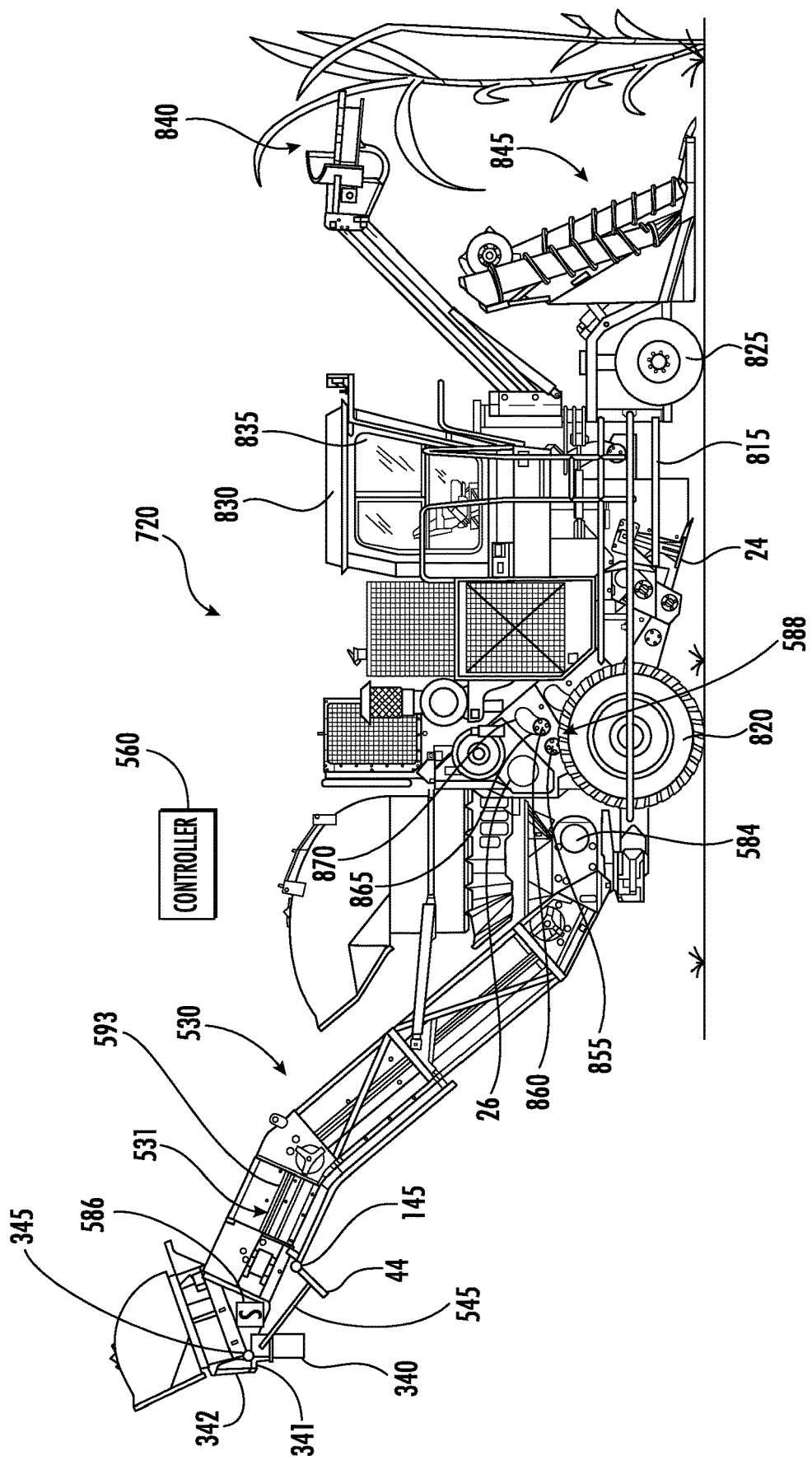
FIG. 9 is a side view illustrating portions of an example sugarcane harvester.

FIG. 9 is a side view of an example sugarcane harvester 720. Harvester 720 may comprise an example implementation of harvester 520 described above. Those portions of harvester 720 not shown in FIG. 9 are schematically illustrated or represented in FIG. 8.

Harvester 720 comprises a frame 815 supported on a pair of rear drive wheels 820 and a pair of steerable front wheels 825, only one of which is shown. It is also contemplated that the front wheels 825 could also be powered or tracks (not shown) could be used to support the harvester 720. An operator station 830 is located at a central, forward location of the frame 15, and located behind the operator station 830 is an engine (not shown), which provides the power for driving the wheels 820 and other driven components of the harvester 720. An operator interface 835 is coupleable to the operator station 830 and enables an operator to set an elevator speed of the elevator 530. An elevator belt or web 593 is rotated by a compliance drive 584, in the form of an elevator motor 39, at the elevator speed.

The operator station 830 gives a seated or standing operator a vantage point for viewing the operation of front-mounted equipment including a topper mechanism 840 mounted to the frame 815 between right- and left-hand crop divider assemblies 845. Located just behind and inwardly of the front wheels 825 of the harvester 720, so as to be at opposite sides of a longitudinal centerline of the harvester, are right- and left-hand base cutters 24, only one of which is shown, having cutting blades located so as to overlap at the middle of the harvester 10.

Thus, during operation, the crop divider assemblies 845 straddle a row of cane stalks which pass beneath the frame 815 and are severed from the ground by the base cutters 24. The base cutters 24 provide the cut canes or stalks to a plurality of lower feed rollers 855 and a plurality of upper feed rollers 860 in communication with the base cutters 24 to receive and feed the cut sugarcane through the harvester 720. The plurality of upper feed rollers 860 are movable from a first position 865 to a second position 870 to enable varying volumes of cut sugarcane to pass. The plurality of upper feed rollers 860 are movable from the first position 865 to the second position 870, that is higher than the first position 865, along a linear or non-linear path.

At least one crop mass, or volumetric, flow sensor 588, 590, 592 is configured to provide a crop mass, or volumetric, flow feedback signal indicative of the crop mass flow or crop volumetric flow. Mass flow is a dynamic mass per time unit. Mass flow can be calculated from a volumetric flow when the temperature and pressure are known. It is common to specify mass flow in terms of volumetric flow at standard conditions. Both mass flow and volumetric flow are contemplated by this disclosure.

In the example implementation, flow sensor 588 may be a height sensor that measures the distance moved by the plurality of upper feed rollers 860. In another implementation, the plurality of upper feed rollers 860 may be two upper feed rollers 860 and the flow sensor 588 may be two crop mass flow feedback devices positioned adjacent the upper feed rollers 860 and the distance moved may be an average of the distance moved by each upper feed roller 860. Alternatively, the flow sensor 588 may be configured to measure an angle of pivot. Controller 560 may relate relates the distance moved or angle of pivot to crop mass flow using a lookup table.

As discussed above, controller 560 may utilize a sensed flow of billets and the rate at which billets are being conveyed or move through harvester 720 as part of the basis for adjusting the positioning of billet deflectors 340 and 44. Adjusting the positioning of billet deflectors 340 and 44 may additionally be based upon the fill characteristic of volume 362 as determined by controller 560 (as described above). In other implementations, the pivoting or repositioning of deflectors 340 and 44 may be adjusted based upon other factors or determinations. For example, such pivoting may occur in response to an operator input.

In the example illustrated, billet deflectors 340 is operably coupled to powered actuator 342 by an angled lever 341 having a first end pivotally connected to actually 342 and a second end pivotably connected to deflector 340. Billet deflectors 340 and 44 are interconnected by linkage 545, such that controller 560 may output control signals to the single powered actuator 342 (in the form of a hydraulic piston-cylinder assembly and associated hydraulic pump and valves) to pivot forward billet deflector 340 about pivot axis 345 which results in rearward billet deflector 44 also pivoting about axis 145.

Although the present disclosure has been described with reference to example implementations, workers skilled in the art will recognize that changes may be made in its form and detail without departing from the disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A sugarcane harvester comprising:
   a base cutter configured to cut sugarcane;
   a chopping device in communication with the base cutter to receive the sugarcane cut by the base cutter, the chopping device configured to chop the cut sugarcane into billets;
   an elevator in communication with the chopping device, the elevator configured to transport the billets out of the sugarcane harvester, the elevator having a discharge end;
   a forward billet deflector attached at a first location beyond the discharge end of the elevator distant the discharge end;
   a rearward billet deflector moveably attached at a second location proximate the discharge end and spaced from the forward billet deflector such that the billets fall between the forward billet deflector and the rearward billet deflector; and
   a controller and powered actuator configured to move the rearward billet deflector to control a discharge direction of the billets.

2. The sugarcane harvester of claim 1, further comprising a mechanical linkage connecting the forward billet deflector and the rearward billet deflector, wherein the powered actuator is configured to concurrently move the forward billet deflector and the rearward billet deflector.

3. The sugarcane harvester of claim 2, wherein the controller receives fill signals indicating a fill characteristic of a volume receiving the billets discharged by the elevator, the controller configured to output control signals to the powered actuator to adjust the discharge direction of the billets based upon the fill signals.

4. The sugarcane harvester of claim 3, further comprising a sensor supported by the elevator to output the fill signals.

5. The sugarcane harvester of claim 3, wherein the controller is configured to output second control signals to adjust fore-aft relative positioning of the volume and the elevator based upon the fill signals.

6. The sugarcane harvester of claim 5, wherein the volume is to be moved alongside the sugarcane harvester and wherein the second control signals adjust a relative fore-aft positioning of the sugarcane harvester and the volume.

7. The sugarcane harvester of claim 1, further comprising a sensor to detect a characteristic of a flow of the billets prior to reaching the discharge end of the elevator and wherein the controller is configured to control the powered actuator to move the rearward billet deflector upon the characteristic of the flow.

8. The sugarcane harvester of claim 1, wherein the powered actuator is to pivot the rearward billet deflector relative to the elevator.

9. The sugarcane harvester of claim 1, further comprising a second powered actuator to move the forward billet deflector.

10. The sugarcane harvester of claim 9, wherein movement of the rearward billet deflector by the powered actuator and movement of the forward billet deflector by the second powered actuator are synchronized.

11. The sugarcane harvester of claim 9 further comprising a controller to receive fill signals indicating a fill characteristic of a volume receiving the billets discharged by the elevator, the controller configured to output control signals to the powered actuator to adjust the discharge direction of the billets based upon the fill signals.

12. The sugarcane harvester of claim 11, further comprising a sensor supported by the elevator to output the fill signals.

13. The sugarcane harvester of claim 1, wherein the controller is configured to receive fill signals indicating a fill characteristic of a volume receiving the billets discharged by the elevator, the controller configured to output control signals to the powered actuator to adjust the discharge direction of the billets based upon the fill signals.

14. The sugarcane harvester of claim 13, wherein the controller is configured to output second control signals to adjust fore-aft relative positioning of the volume and the elevator based upon the fill signals.

15. The sugarcane harvester of claim 14, wherein the volume is to be moved alongside the sugarcane harvester and wherein the second control signals adjust a relative fore-aft speed of movement of the sugarcane harvester and fore-aft speed of movement of the volume.

16. The sugarcane harvester of claim 1, wherein the controller is configured to receive fill signals indicating a fill characteristic of a volume receiving the billets discharged by the elevator, the controller configured to output control signals to the powered actuator to control the discharge direction of the billets based upon the fill signals.

17. The sugarcane harvester of claim 16, wherein the forward billet deflector is spaced from the rearward billet deflector such that billets fall into the volume.

* * * * *